United States Patent [19]
Goodson et al.

[11] Patent Number: 5,226,060
[45] Date of Patent: Jul. 6, 1993

[54] MODEM RECEIVER WITH NONLINEAR EQUALIZATION

[75] Inventors: Richard L. Goodson, Huntsville; Mickey C. Rushing, Harvest; Jack L. Hayes, Huntsville, all of Ala.

[73] Assignee: Universal Data Systems, Inc., Huntsville, Ala.

[21] Appl. No.: 818,021

[22] Filed: Jan. 8, 1992

[51] Int. Cl.$^5$ .................... H03H 7/30; H03H 7/40
[52] U.S. Cl. ........................................ 375/14; 375/8
[58] Field of Search ...................... 375/14, 12, 11, 8

[56] References Cited

U.S. PATENT DOCUMENTS 4,213,095  7/1980  Falconer ........................... 375/14

OTHER PUBLICATIONS

"Adaptive Equalization of Channel Nonlinearities on QAM Data Transmission Systems", by D. D. Falconer, The Bell System Technical Journal, vol. 57, No. 7, Sep. 1978.

Primary Examiner—Curtis Kuntz
Assistant Examiner—Bryan Webster
Attorney, Agent, or Firm—Wayne J. Egan

[57] ABSTRACT

A modem with nonlinear equalization (100) receives a signal (101) that includes linear and nonlinear distortion. The modem includes a multiplier (107) that frequency shifts the signal to form a baseband signal, which is then sampled by an A/D converter (114) to provide a complex receiver input sample, R(n). A first equalizer (117) equalizes R(n) to form a first equalized result (n). A nonlinear generator (129) forms $|R(n)|^2 R(n)$, which is then equalized by a second equalizer (133) to form a second equalized result (n). A summing device (121) combines the first equalized result (n) with the second equalized result (n) to form a composite equalized result (n). The modem includes a data recovery circuit (125) that determines a received signal point (n) based on the composite equalized result (n) and a predetermined constellation.

40 Claims, 2 Drawing Sheets

MODEM RECEIVER

INCORPORATION BY REFERENCE OF ANOTHER U.S. PATENT

The applicant hereby incorporates by reference U.S. Pat. No. 4,213,095, David D. Falconer, "Feedforward Nonlinear Equalization of Modulated Data Signals," issued Jul. 15, 1980, verbatim and with the same effect as though the same patent were fully and completely set forth herein.

FIELD OF THE INVENTION

This application relates to modems including, but not limited to, modems having equalizers for removing distortion.

BACKGROUND OF THE INVENTION

Presently, data communication equipment ("DCE"), such as modems, for example, are used to transport digital data between data terminal equipment such as personal computers, workstations and the like, over channels, such as telephone lines. Typically, the communication signal includes digital data in the form of a carrier signal that is modulated by a predetermined transmit constellation of signal points. Each signal point of the transmit constellation represents a digital code or value to be transported. At the sending DCE, a carrier signal is thus modulated at the constellation signal point corresponding to the digital code or value to be transported over the channel. At the receiving DCE, the modulated carrier signal may include distortion induced as a result of the transmission process. The carrier signal is removed, and a received signal point is then identified from a receive constellation. The digital code or value represented by the signal point may then be obtained from a memory device, such as a look-up table.

The effect of nonlinear channel distortion on high-speed data transmission using modems is known. See, for instance David D. Falconer, "Adaptive Equalization of Channel Nonlinearities in QAM Data Transmission Systems," Bell System Technical Journal, Vol. 57, No. 7, page 2589 et seq. As explained therein, such nonlinear channel distortion introduces nonlinear interference in the receiving modem. Nonlinear distortion thus results in an increased probability for decoding errors in the receiving modem. Moreover, the effect of the channel distortion becomes more pronounced for higher data speeds, thus resulting in unacceptable levels of errors.

One approach to solving this problem is to equip the receiving modem with an equalizer to compensate the received signal for the presence of the unwanted nonlinear distortion. Thus, after the equalizer compensates the received signal for the distortion, the decoder can extract signal points from the resulting signal with less chance of error.

Equalizers are known for compensating a received signal for nonlinear channel distortion. In the past, however, such equalizers have typically been complex and, as a result, costly to implement.

As a result, there is a need to provide a modem with nonlinear equalization for equalizing a received signal to compensate for nonlinear distortion.

DETAILED DESCRIPTION

Figure 1:
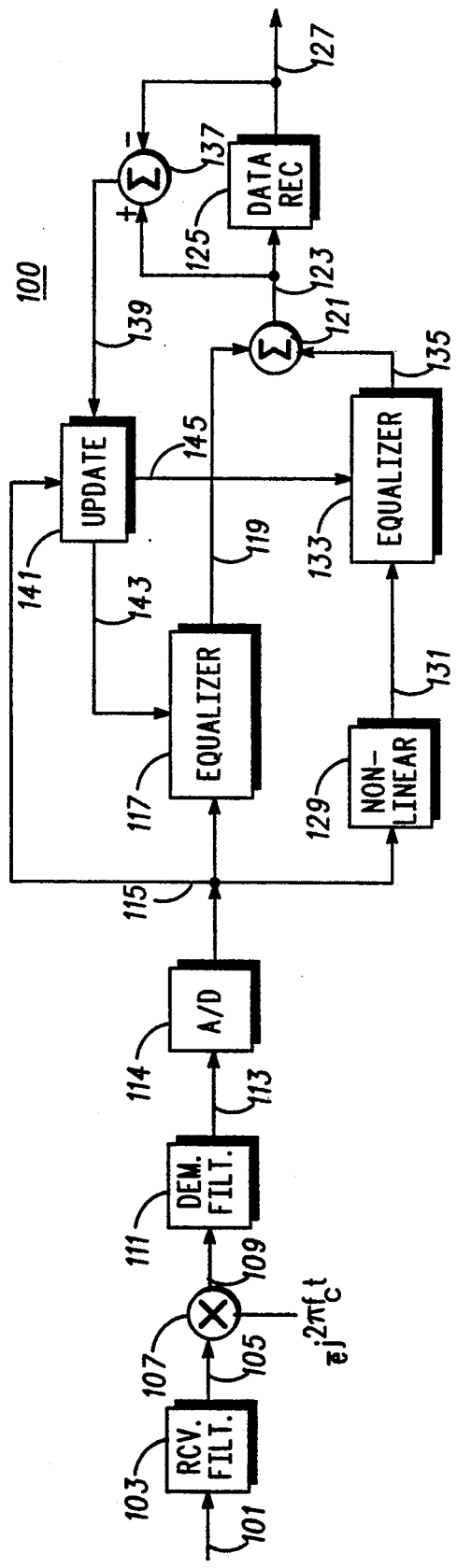
FIG. 1 is a block diagram that shows a first embodiment of a modem with nonlinear equalization, in accordance with the present invention.

Referring now to FIG. 1, there is shown a first embodiment of a modem with nonlinear equalization 100, in accordance with the present invention. A description of operation follows.

The received signal 101 is a signal including a carrier signal of frequency $f_c$ that is modulated at the baud rate using a predetermined quadrature amplitude modulation ("QAM") constellation having a plurality of signal points. The signal 101 typically includes both linear and nonlinear distortion. Theoretically, an infinite number of separate and distinct QAM constellations are possible. One example of a QAM constellation is, for instance, a V.32-type.

The received signal 101 then is applied to a receive filter 103, which is typically a band-pass design.

The filtered result 105 is then frequency shifted by a multiplier 107 by a spectrum amount equal to $f_c$, thus providing a baseband signal 109. The baseband signal 109 is then filtered by a demodulator filter 111, typically a low-pass design, thus providing a filtered baseband signal 113.

The filtered baseband signal 113 is then converted to digital samples by an analog-to-digital ("A/D") converter 114. The A/D converter 114 samples the filtered baseband signal 113 at a sampling rate $f_s = k/T$, where T is the inverse of the baud rate, and k is an integer such as, for instance, 1, 2 or 3. The A/D converter 114 provides a resulting digitized signal 115, which is the complex receiver input sample, R(n).

As shown, the sample R(n), 115, is applied to a first equalizer, 117, which produces a first equalized result (n), 119.

The sample R(n), 115, is also applied to a nonlinear generator 129. The generator 129 provides a result 131 based on $|R(n)|^2 R(n)$. The result 131 will include the third harmonic of R(n), 115.

The result 131 is then applied to a second equalizer 133. The second equalizer 133 produces a second equalized result (n), 135.

The first equalized result (n) 119 is then combined with the second equalized result (n) 135 by means of a first summing device 121.

The summing device 121 now forms a composite equalized result (n) 123 that is based on the combination of the first equalized result 119 and the second equalized result 135.

The composite equalized result (n) 123 is now applied to a data recovery circuit 125. The circuit 125 is a typical design known in the art, and is based on the predetermined QAM constellation.

As is known, a constellation is a set of points in the complex plane. The points, in turn, correspond to a set of digital codes or values such that, for each digital code or value to be communicated, there is one and only one point on the constellation. Each point has a unique magnitude and phase, based on its location in the complex plane.

Thus, the circuit 125 examines the composite equalized result (n) 123 and, based thereupon, determines the point on the QAM constellation that is closest to the composite equalized result (n) 123 as the received signal point (n). Then, at predetermined time intervals based on the baud rate of the signal 101, the circuit 125 generates the received signal point (n) as an output 127.

It will be appreciated that the signal 101 will generally include both linear and nonlinear distortion. As a result, the complex receiver input sample, R(n), 115, will include both a linear distortion component and a nonlinear distortion component.

An important goal of the first equalizer 117 is to form a first equalized result (n) 119 that is compensated for the linear distortion component. This result 119, of course, will still include a nonlinear distortion component that is uncompensated.

For this reason, the second equalized result (n) 135 is provided by forming $|R(n)|^2 R(n)$, 131, via the nonlinear generator 129, and then equalizing the result 131 via the second equalizer 133. The second equalized result (n) 135 will include the uncompensated nonlinear component.

By thus combining the first equalized result (n) 119 with the second equalized result (n) 135 via the summing device 121, there is formed a composite equalized result (n) 123 that is substantially compensated for both the linear distortion component and the nonlinear distortion component.

The data recovery circuit 125 thus utilizes the composite equalized result (n) 123 to determine the received signal point (n) 127. As a result of the result 123 being equalized for both linear distortion and nonlinear distortion, the circuit 125 will determine the received signal point (n) 127 with substantially less error. Thus, if the linear distortion and the nonlinear distortion were substantially compensated, the error would approach zero.

Conversely, however, if the distortion is not 100% compensated, then the composite equalized result (n) 123 will include a finite error. For this reason, an error signal E(n) 139 is generated by the summing device 137. As shown, the summing device 137 detects both the composite equalized result (n) 123 and the received signal point (n) 127, and forms E(n) 139 based on the difference therebetween.

As above, the data recovery circuit 125 determines the received signal point (n) 127 based on the constellation point that is closest to the composite equalized result (n) 123. It will be appreciated that if the complex receiver input sample, R(n), 115 were completely compensated for linear and nonlinear distortion, then the corresponding composite equalized result (n) 123 would exactly coincide with the correct constellation point, and the output result 127 thus would equal the input result 123. Moreover, since the summing device 137 forms an error signal E(n) 137 based on the difference between the result 123 and the result 127, then E(n) would equal zero (0).

In a typical situation, however, equalization will not be complete and thus the composite equalized result (n) 123 will not exactly coincide with the correct constellation point. As a result, the output result 127 will not equal the input result 123, and thus the error signal E(n) 139 will be finite, and will not equal zero.

In accordance with the present invention, an update circuit 141 utilizes the signal E(n) 139 to adjust the first equalizer 117 and the second equalizer 133 in order to optimize their performance with respect to equalizing the subsequent sample, R(n+1) 115.

Figure 3:
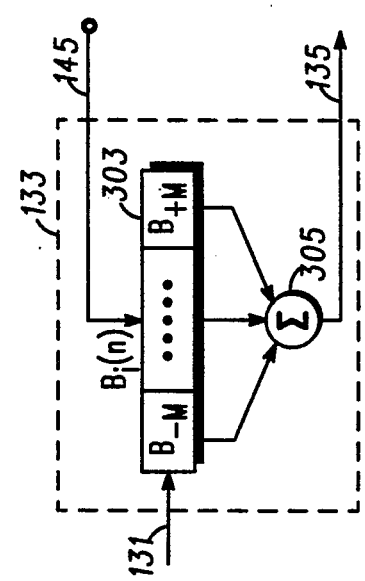
FIGS. 2-3 are further block diagrams for the first embodiment.
Figure 2:
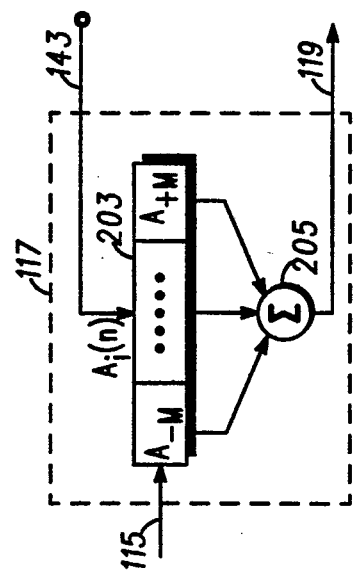

The first equalizer 117 is depicted in FIG. 2, and the second equalizer 133 is depicted in FIG. 3.

The first equalizer 117 and the second equalizer 133 are linear adaptive-type. In one embodiment, for example, both equalizers are adapted using well-known least-means-squared algorithms.

The first equalizer 117 includes first coefficients (n) 143 and the second equalizer 133 includes second coefficients (n) 145. In accordance with the present invention, the update circuit 141 utilizes the error signal E(n) 139 and the complex receiver input sample, R(n), 115 in order to determine first coefficients (n+1) and second coefficients (n+1) to minimize the error signal E(n). Moreover, by thus adjusting the first coefficients (n) 143 and the second coefficients (n) 145, the performance of the first equalizer 117 and the second equalizer 133 is thereby optimized.

Referring to FIG. 2, the first equalizer 117 comprises a delay line 203 having a plurality (2M+1) of tapped delay stages, the stages designated $-M$ through $+M$. The contents of the ith stage is multiplied by a corresponding stage tap coefficient, $A_i(n)$. There are thus provided a corresponding plurality of output signals that are combined in a summing device 205, which provides the output 119.

Thus, the first equalized result (n) 119 consists of a combination of received samples $R(n-i)$, 115, each sample n being weighted by the first tap coefficients $A_i(n)$, 143, where i varies from $-M$ to $+M$. The weighted samples are then combined by the summing device 205, which forms the first equalized result (n), 119.

In one embodiment, the circuit 141 updates the first tap coefficients 143 by the updating relationship:

$$A_i(n+1)=A_i(n)-\partial(n)R^*(n-i)E(n),$$

where $R^*(n-i)$ is the complex conjugate of $R(n-i)$, and $\partial(n)$ is a selected scaling factor. The factor $\partial(n)$ may be updated each sampling period, or determined empirically, or both.

Referring to FIG. 3, the second equalizer 133 comprises a delay line 303 having a plurality (2M+1) of tapped delay stages, the stages designated $-M$ through $+M$. The contents of the ith stage is multiplied by a corresponding stage tap coefficient, $B_i(n)$. There are thus provided a corresponding plurality of output signals that are combined in a summing device 305, which provides the output 135.

Thus, the second equalized result (n) 135 consists of a combination of received samples $|R(n-i)|^2 R(n-i)$, 131, each sample n being weighted by the second tap coefficients $B_i(n)$, 145, where i varies from $-M$ to $+M$. The weighted samples are then combined by the summing device 305, which forms the second equalized result (n), 135.

In one embodiment, the circuit 141 updates the second tap coefficients 145 by the updating relationship:

$$B_i(n+1)=B_i(n)-f(n)|R(n-i)|^2 R^*(n-i)E(n),$$

where $f(n)$ is a selected scaling factor. The factor $f(n)$ may be updated each sampling period, or determined empirically, or both.

The effect of the circuit 141 thus adjusting the first tap coefficients 143 and the second tap coefficients 145 is to yield a composite equalized result (n) 123 that minimizes the error, E(n). Ideally, E(n) will ultimately approach zero, corresponding to a composite equalized result (n) 123 that is completely equalized for both linear and nonlinear distortion.

The effect of updating the first tap coefficients $A_i(n)$, 143, and the second tap coefficients $B_i(n)$, 145, in accordance with the foregoing algorithms is to minimize the average squared magnitude of the signal E(n).

A similar technique for updating tap coefficients may be found in the David D. Falconer U.S. Pat. No. 4,213,095, which patent has been incorporated by reference hereinabove.

The above algorithms are not the only ones that may be used to update the first tap coefficients 143 and the second tap coefficients 145. In another embodiment, for example, the first tap coefficients (n+1) 143 and the second tap coefficients (n+1) 145 may be determined such that the gradient of the average squared magnitude of E(n) approaches zero(0). In still another embodiment, the first tap coefficients (n+1) 143 and the second tap coefficients (n+1) 145 may be determined to minimize the gradient of the average squared magnitude of E(n).

Figure 4:
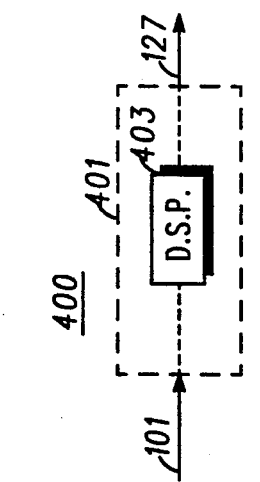
FIG. 4 is a block diagram that shows a second embodiment of a modem with nonlinear equalization, in accordance with the present invention.

FIG. 4 shows a second embodiment of a modem with nonlinear equalization 400, in accordance with the present invention. Similar to the first embodiment described above, the incoming signal 101 includes a carrier signal of frequency $f_c$ that is modulated using a predetermined constellation having a plurality of signal points. The signal 101 includes linear and nonlinear distortion. The modem 401 includes a digital signal processor ("DSP") 403 such as, for instance, the DSP56000, available from Motorola, Inc. The DSP is programmed to process the signal 101 and generate received signal points 127 in accordance with the flow diagram depicted in FIG. 5.

Figure 5:
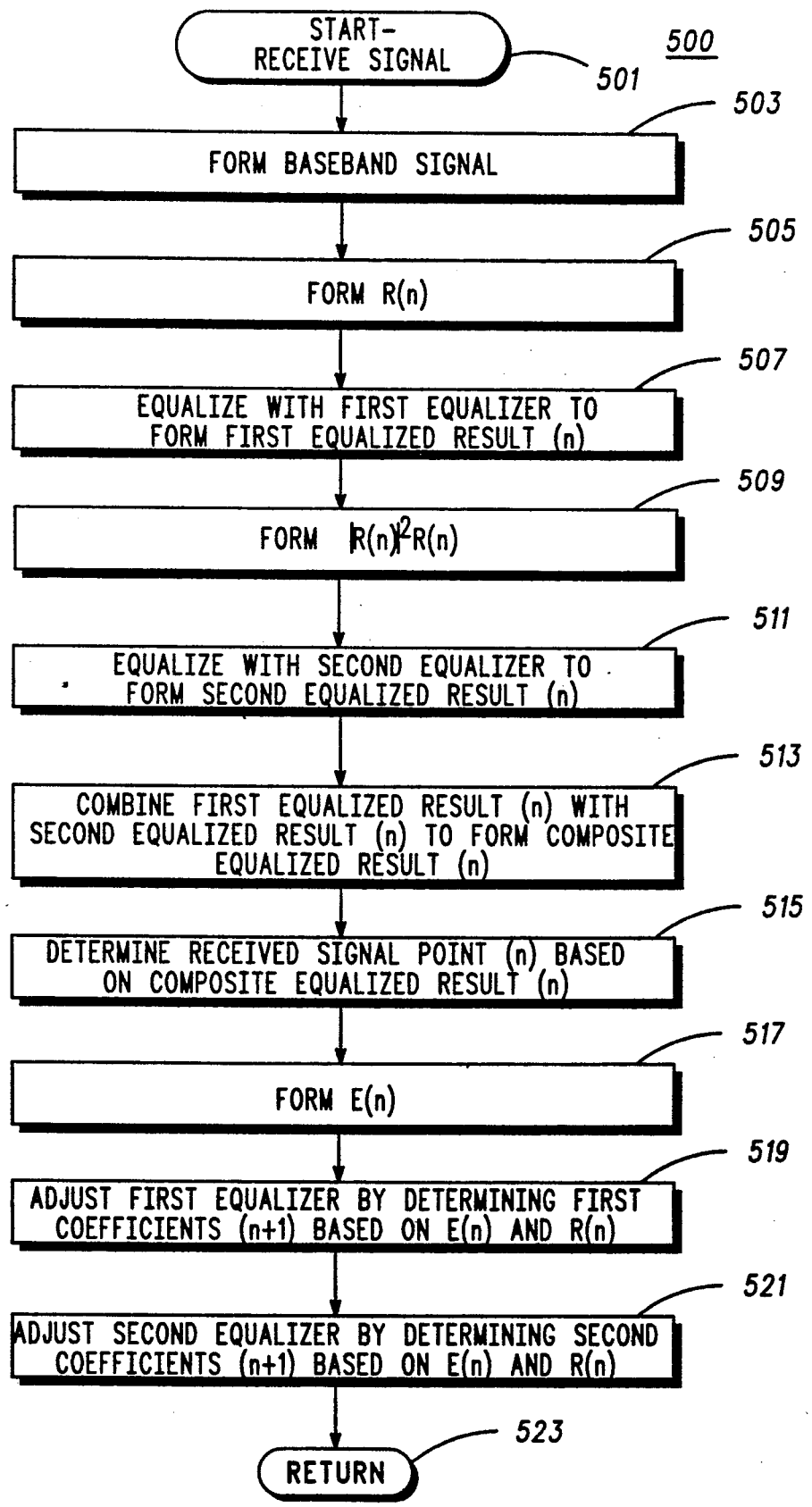
FIG. 5 is a flow diagram for the second embodiment.

Referring now to FIG. 5, the process starts by receiving the signal 101, step 501.

The signal 101 is then frequency shifted at the carrier rate to form a baseband signal, step 503. It will be appreciated that this step 503 is analogous to the processing provided by the receive filter 103 and the multiplier 107 in FIG. 1.

The baseband signal is then sampled to form a complex receiver input sample, R(n), step 505. This step 505 is analogous to the processing provided by the demodulator filter 111 and the A/D converter 114 in FIG. 1.

The complex receiver input sample, R(n), is then equalized with a first equalizer to form a first equalized result (n), step 507. This step 507 is analogous to the signal processing provided by the first equalizer 117 in FIG. 1.

The process then forms $|R(n)|^2 R(n)$, step 509. This step 509 is analogous to the processing provided by the nonlinear generator 129 in FIG. 1.

Next, the process equalizes $|R(n)|^2 R(n)$ with a second equalizer to form a second equalized result (n), step 511. This step 511 is analogous to the signal processing provided by the second equalizer 133 in FIG. 1.

The process then combines the first equalized result (n) with the second equalized result (n) to form a composite equalized result (n), step 513. This step 513 is analogous to the signal processing provided by the summing device 121 in FIG. 1.

The process then, at the baud rate, determines a received signal point (n) based on the composite equalized result (n) and the predetermined constellation, step 515. This step 515 is analogous to the signal processing provided by the data recovery circuit 125 in FIG. 1.

Similar to the first embodiment described above, the first equalizer may be a linear adaptive type including first coefficients (n), and the second equalizer may be a linear adaptive type including second coefficients (n).

The process then forms an error signal, E(n), based on the received signal point (n) and the composite equalized result (n), step 517. This step 517 is analogous to the signal processing provided by the summing device 137 in FIG. 1.

The process then adjusts the first equalizer by, based on E(n) and R(n), determining first coefficients (n+1) to minimize the average squared magnitude of E(n), step 519.

The process also adjusts the second equalizer by, based on E(n) and R(n), determining second coefficients (n+1) to minimize the average squared magnitude of E(n), step 521.

It will be appreciated that the steps 519 and 521 are analogous to the signal processing provided by the update circuit 141 in FIG. 1.

The process then repeats the preceding steps, step 523.

Thus, a modem with nonlinear equalization, in accordance with the present invention, includes a first equalizer to compensate for linear channel distortion and a second equalizer to compensate for nonlinear channel distortion. The first equalizer is similar to the second equalizer, but the first equalizer uses a demodulated sample as an input, whereas the second equalizer uses the third-harmonic of the demodulated sample as an input. Thus arranged, the second equalizer output directly correlates with the nonlinear distortion added by the channel. Combining the second equalizer output with the first equalizer output thus yields a composite equalized result that is compensated for the nonlinear channel distortion.

Harmonic and/or intermodulation distortion and random noise have similar effects on performance in a high-speed modem. In lower-rate modems, the harmonic distortion is small, relative to the constellation point-spacing and, moreover, does not affect performance. But with higher-speed modems such as, for instance, a 19.2 KBit-per-second modem, the harmonic distortion creates a noise floor in which the modem cannot perform. It has been shown, however, that a modem with nonlinear equalization, in accordance with the present invention, is effective in this environment.

As mentioned above, equalizers are known for compensating a received signal for nonlinear channel distortion. Prior equalizing techniques, however, have typically proved complex and, as a result, costly to implement.

One key advantage of a modem with nonlinear equalization, in accordance with the present invention, is its simplicity, especially when viewed in terms of the amount of software code needed to implement a typical embodiment. In one typical DSP-based 19.2 KBit-per-second embodiment, for example, full utilization of techniques in accordance with the present invention resulted in the equalizer portion of the software code being reduced by substantially ninety per-cent (90%), when compared to existing techniques. Thus, in one embodiment, the total lines of code needed to implement an equalizer, in accordance with the present invention, was approximately ten per-cent (10%) of the corresponding lines of code needed to implement an equalizer using existing techniques. Moreover, because it requires substantially less software code, a modem with nonlinear equalization, in accordance with the present invention, will enjoy substantial improvements in processor cycle time, throughput, and cost, as well. Moreover, the foregoing benefits are manifest in a modem with nonlinear equalization, in accordance with the present invention, whilst such a modem may be expected to achieve comparable error performance results over telephone channels having moderate levels of nonlinear distortion.

Thus, a modem with nonlinear equalization, in accordance with the present invention, improves the performance of a high-speed modem on channels having nonlinear distortion. Moreover, such a modem effectively compensates for harmonic and/or intermodulation distortion.

While various embodiments of a modem with nonlinear equalization, in accordance with the present invention, have been described hereinabove, the scope of the invention is defined by the following claims.

What is claimed is:

1. A modem receiver arranged for receiving a signal including a carrier signal that is modulated using a predetermined constellation having a plurality of signal points, the signal including linear and nonlinear distortion, the modem receiver further arranged for demodulating the signal to provide a received signal point (n), the modem receiver comprising:
   means for frequency shifting the signal to form a baseband signal;
   means for sampling the baseband signal to provide a complex receiver input sample, $R(n)$;
   first equalizer means for equalizing $R(n)$ to form a first equalized result (n);
   means for forming $|R(n)|^2 R(n)$;
   second equalizer means for equalizing $|R(n)|^2 R(n)$ to form a second equalized result (n);
   means for combining the first equalized result (n) with the second equalized result (n) to form a composite equalized result (n);
   means for determining a received signal point (n) based on the composite equalized result (n) and the predetermined constellation.

2. The modem receiver of claim 1, wherein the predetermined constellation is a quadrature amplitude modulation constellation.

3. The modem receiver of claim 2, wherein the first equalizer means is a linear adaptive type.

4. The modem receiver of claim 3, wherein the second equalizer means is a linear adaptive type.

5. The modem receiver of claim 4, further including:
   means for forming an error signal $E(n)$ based on the received signal point (n) and the composite equalized result (n).

6. The modem receiver of claim 5 where the first equalizer means includes first coefficients (n) and the second equalizer means includes second coefficients (n), and where the modem receiver further includes:
   first update means for determining first coefficients (n+1) based on $E(n)$ and $R(n)$ to minimize the average squared magnitude of $E(n)$;
   second update means for determining second coefficients (n+1) based on $E(n)$ and $R(n)$ to minimize the average squared magnitude of $E(n)$.

7. The modem receiver of claim 6, wherein:
   the first coefficients (n+1) are determined so the gradient of the average squared magnitude of $E(n)$ approaches zero, and
   the second coefficients (n+1) are determined so the gradient of the average squared magnitude of $E(n)$ approaches zero.

8. The modem receiver of claim 6, wherein:
   the first coefficients (n+1) are determined to minimize the magnitude of the gradient of the average squared magnitude of $E(n)$, and
   the second coefficients (n+1) are determined to minimize the magnitude of the gradient of the average squared magnitude of $E(n)$.

9. The modem receiver of claim 6, wherein the second update means includes means for determining the second coefficients (n+1) based on $E(n)$ and $|R(n)|^2 R(n)$.

10. The modem receiver of claim 9, wherein:
    the first equalizer means is based on a least-means-squared algorithm and includes tap coefficients, $A_i$, and wherein $A_i(n+1)$ is based on $A_i(n) - \partial(n) R^*(-n-i) E(n)$, and,
    the second equalizer means is based on a least-means-squared algorithm and includes tap coefficients, $B_i$, and wherein $B_i(n+1)$ is based on $B_i(n) - f(n) |R(-n-i)|^2 R^*(n-i) E(n)$.
    where $R^*(n-i)$ is the complex conjugate of $R(n-i)$ and $\partial(n)$ and $f(n)$ are scaling factors.

11. An equalizer arranged for use with a modem receiver, the modem receiver arranged for receiving a signal including a carrier signal that is modulated using a predetermined constellation having a plurality of signal points, the signal including linear and nonlinear distortion, the modem receiver further arranged for demodulating the signal to provide a received signal point (n), the modem receiver comprising:
    means for frequency shifting the signal to form a baseband signal;
    means for sampling the baseband signal to provide a complex receiver input sample, $R(n)$;
    the equalizer including:
    first equalizer means for equalizing $R(n)$ to form a first equalized result (n);
    means for forming $|R(n)|^2 R(n)$;
    second equalizer means for equalizing $|R(n)|^2 R(n)$ to form a second equalized result (n); and,
    means for combining the first equalized result (n) with the second equalized result (n) to form a composite equalized result (n);
    the modem receiver further comprising means for determining a received signal point (n) based on the composite equalized result (n) and the predetermined constellation.

12. The equalizer of claim 11, wherein the predetermined constellation is a quadrature amplitude modulation constellation.

13. The equalizer of claim 12, wherein the first equalizer means is a linear adaptive type.

14. The equalizer of claim 13, wherein the second equalizer means is a linear adaptive type.

15. The equalizer of claim 14, further including:
    means for forming an error signal $E(n)$ based on the received signal point (n) and the composite equalized result (n).

16. The equalizer of claim 15 where the first equalizer means includes first coefficients (n) and the second equalizer means includes second coefficients (n), and further including:

first update means for determining first coefficients (n+1) based on E(n) and R(n) to minimize the average squared magnitude of E(n);

second update means for determining second coefficients (n+1) based on E(n) and R(n) to minimize the average squared magnitude of E(n).

17. The equalizer of claim 16, wherein:
the first coefficients (n+1) are determined so the gradient of the average squared magnitude of E(n) approaches zero, and
the second coefficients (n+1) are determined so the gradient of the average squared magnitude of E(n) approaches zero.

18. The equalizer of claim 16, wherein:
the first coefficients (n+1) are determined to minimize the magnitude of the gradient of the average squared magnitude of E(n), and
the second coefficients (n+1) are determined to minimize the magnitude of the gradient of the average squared magnitude of E(n).

19. The equalizer of claim 16, wherein the second update means includes means for determining the second coefficients (n+1) based on E(n) and $|R(n)|^2 R(n)$.

20. The equalizer of claim 19, wherein:
the first equalizer means is based on a least-means-squared algorithm and includes tap coefficients, $A_i$, and wherein $A_i(n+1)$ is based on $A_i(n) - \partial(n) R^*(n-i) E(n)$, and,
the second equalizer means is based on a least-means-squared algorithm and includes tap coefficients, $B_i$, and wherein $B_i(n+1)$ is based on $B_i(n) - f(n) |R(n-i)|^2 R^*(n-i) E(n)$,
where $R^*(n-i)$ is the complex conjugate of $R(n-i)$ and $\partial(n)$ and $f(n)$ are scaling factors.

21. In a modem receiver arranged for receiving a signal including a carrier signal that is modulated using a predetermined constellation having a plurality of signal points, the signal including linear and nonlinear distortion, a method for demodulating the signal to provide a received signal point (n), the method comprising the following steps:
(a) frequency shifting the signal to form a baseband signal;
(b) sampling the baseband signal to provide a complex receiver input sample, R(n);
(c) equalizing R(n) with a first equalizer to form a first equalized result (n);
(d) forming $|R(n)|^2 R(n)$;
(e) equalizing $|R(n)|^2 R(n)$ with a second equalizer to form a second equalized result (n);
(f) combining the first equalized result (n) with the second equalized result (n) to form a composite equalized result (n);
(g) determining a received signal point (n) based on the composite equalized result (n) and the predetermined constellation.

22. The method of claim 21, wherein the predetermined constellation is a quadrature amplitude modulation constellation.

23. The method of claim 22, wherein the first equalizer is a linear adaptive type.

24. The method of claim 23, wherein the second equalizer is a linear adaptive type.

25. The method of claim 24 including the step of:
(h) forming an error signal E(n) based on the received signal point (n) and the composite equalized result (n).

26. The method of claim 25 where the first equalizer includes first coefficients (n) and the second equalizer includes second coefficients (n) and including the steps of:
(i) based on E(n) and R(n), determining first coefficients (n+1) to minimize the average squared magnitude of E(n);
(j) based on E(n) and R(n), determining second coefficients (n+1) to minimize the average squared magnitude of E(n).

27. The method of claim 26, wherein:
the first coefficients (n+1) are determined so the gradient of the average squared magnitude of E(n) approaches zero, and
the second coefficients (n+1) are determined so the gradient of the average squared magnitude of E(n) approaches zero.

28. The method of claim 26, wherein:
the first coefficients (n+1) are determined to minimize the magnitude of the gradient of the average squared magnitude of E(n), and
the second coefficients (n+1) are determined to minimize the magnitude of the gradient of the average squared magnitude of E(n).

29. The method of claim 26, wherein step (j) includes a step of determining the second coefficients (n+1) based on E(n) and $|R(n)|^2 R(n)$.

30. The method of claim 29, wherein:
the first equalizer is based on a least-means-squared algorithm and includes tap coefficients, $A_i$, and wherein $A_i(n+1)$ is based on $A_i(n) - \partial(n) R^*(n-i) E(n)$, and,
the second equalizer is based on a least-means-squared algorithm and includes tap coefficients, $B_i$, and wherein $B_i(n+1)$ is based on $B_i(n) - f(n) |R(n-i)|^2 R^*(n-i) E(n)$,
where $R^*(n-i)$ is the complex conjugate of $R(n-i)$ and $\partial(n)$ and $f(n)$ are scaling factors.

31. A modem receiver arranged for receiving a signal including a carrier signal that is modulated using a predetermined constellation having a plurality of signal points, the signal including linear and nonlinear distortion, the modem receiver including a digital signal processor arranged for demodulating the signal to provide a received signal point (n) in accordance with a predetermined method, the predetermined method comprising the following steps:
(a) frequency shifting the signal to form a baseband signal;
(b) sampling the baseband signal to provide a complex receiver input sample, R(n);
(c) equalizing R(n) with a first equalizer to form a first equalized result (n);
(d) forming $|R(n)|^2 R(n)$;
(e) equalizing $|R(n)|^2 R(n)$ with a second equalizer to form a second equalized result (n);
(f) combining the first equalized result (n) with the second equalized result (n) to form a composite equalized result (n);
(g) determining a received signal point (n) based on the composite equalized result (n) and the predetermined constellation.

32. The modem receiver of claim 31, wherein the predetermined constellation is a quadrature amplitude modulation constellation.

33. The modem receiver of claim 32, wherein the first equalizer is a linear adaptive type.

34. The modem receiver of claim 33, wherein the second equalizer is a linear adaptive type.

35. The modem receiver of claim 34, the method including the step of:
   (h) forming an error signal E(n) based on the received signal point (n) and the composite equalized result (n).

36. The modem receiver of claim 35 where the first equalizer includes first coefficients (n) and the second equalizer includes second coefficients (n), the method including the steps of:
   (i) based on E(n) and R(n), determining first coefficients (n+1) to minimize the average squared magnitude of E(n);
   (j) based on E(n) and R(n), determining second coefficients (n+1) to minimize the average squared magnitude of E(n).

37. The modem receiver of claim 36, wherein:
   the first coefficients (n+1) are determined so the gradient of the average squared magnitude of E(n) approaches zero, and
   the second coefficients (n+1) are determined so the gradient of the average squared magnitude of E(n) approaches zero.

38. The modem receiver of claim 36, wherein:
   the first coefficients (n+1) are determined to minimize the magnitude of the gradient of the average squared magnitude of E(n), and
   the second coefficients (n+1) are determined to minimize the magnitude of the gradient of the average squared magnitude of E(n).

39. The modem receiver of claim 36, wherein the step (j) includes a step of determining the second coefficients (n+1) based on E(n) and $|R(n)|^2 R(n)$.

40. The modem receiver of claim 39, wherein:
   the first equalizer is based on a least-means-squared algorithm and includes tap coefficients, $A_i$, and wherein $A_i(n+1)$ is based on $A_i(n) - \partial(n) R^*(n-i) E(n)$, and,
   the second equalizer is based on a least-means-squared algorithm and includes tap coefficients, $B_i$, and wherein $B_i(n+1)$ is based on $B_i(n) - f(n) |R(n-i)|^2 R^*(n-i) E(n)$,
   where $R^*(n-i)$ is the complex conjugate of $R(n-i)$ and $\partial(n)$ and $f(n)$ are scaling factors.

* * * * *